United States Patent [19]
Carroll

[11] 3,827,116
[45] Aug. 6, 1974

[54] ROTARY MATERIAL WORKING APPARATUS
[76] Inventor: William M. Carroll, 1111 E. Dean Rd., Milwaukee, Wis. 53217
[22] Filed: July 11, 1973
[21] Appl. No.: 378,205

Related U.S. Application Data
[63] Continuation-in-part of Ser. No. 161,183, July 9, 1971, abandoned.

[52] U.S. Cl. ................................. 29/38 C, 83/267
[51] Int. Cl. ............................................ B23p 23/00
[58] Field of Search ....... 29/33 J, 33 Q, 33 S, 38 A, 29/38 C, 564; 83/256, 267, 112

[56] References Cited
UNITED STATES PATENTS
| 995,163 | 6/1911 | Leake | 29/33 J |
|---|---|---|---|
| 1,670,287 | 5/1928 | Stickney | 29/38 C X |
| 2,628,413 | 2/1953 | Hallenbeck | 29/38 A |
| 3,131,456 | 5/1964 | Bryant | 29/38 C |

Primary Examiner—Gil Weidenfeld

[57] ABSTRACT

An apparatus for performing multiple forming and material working operations on a plurality of identical workpieces. The disclosure includes a plurality of co-acting die units or work stations carried by vertically reciprocal die shoes. Also carried by one of the die shoes is a work-holding turntable adapted to receive and automatically index workpieces to succeeding work stations located around one-half of the periphery of said turntable while simultaneously advancing other workpieces to similar work stations located around the opposite half of said turntable. At the last station on each half of the turntable, the finished workpieces are ejected, said apparatus producing finished parts at a high rate with a minimum of scrap.

19 Claims, 8 Drawing Figures

ROTARY MATERIAL WORKING APPARATUS

CROSS REFERENCES

This is a continuation in part of application Ser. No. 161,183 filed July 9, 1971 now abandoned.

BACKGROUND OF THE INVENTION

1. Field of the Invention

The present invention relates to an improved machine for forming, workng and machining workpieces of metal or other material, said apparatus being characterized by a unique rotatable, or so-called carrousel-type, work-feeding device.

2. Description of the Prior Art

Heretofore, the conventional method of performing multiple material working operations to produce a finished part or article of manufacture has been to convey a carrier strip of the metal or other stock material from which the part is to be formed through a line of progressive dies or the like, said carrier strip necessarily being substantially wider than the blanks that are to be punched therefrom. In such conventional forming operations the workpieces or blanks are punched out of the stock in aligned, spaced relationship, resulting in a substantial amount of scrap or waste stock material left in the carrier strip, which can be very costly in a large production operation. This is particularly true when the workpieces are of an irregular design or shape, as is frequently the case. With the present invention, on the other hand, it is possible to punch the pieces in an angular or biased arrangement immediately adjacent each other, thereby conserving the amount of stock required. The result is a substantial reduction in the manufacturing cost of the finished part. Moreover, in many instances, material working operations on one workpiece at a time in the conventional "in-line" operations is often a slower, less efficient operation in comparison to the forming of two workpieces simultaneously with the novel rotary work-feeding apparatus featured in the present invention.

Inventors have designed rotary or carrousel-type work-feeding apparatuses in the past intended to increase the speed or efficiency of a manufacturing operation, but many of said prior rotary units have not proven entirely satisfactory for its intended purpose, nor have said prior units included some of the other unique innovations incorporated in the present invention. Examples of such prior devices are disclosed in the following U.S. Pat. Nos: 3,150,439; 3,285,134; 3,492,681; 2,415,037; 2,370,828; 2,649,056; 641,725; and 3,081,655.

SUMMARY OF THE INVENTION

The present invention provides a high speed apparatus for simultaneously performing multiple operations such as cold heading, coining, piercing, shaping, etc. on a plurality of raw material blanks or workpieces in order to produce a large quantity of finished parts in a relatively brief time. Said apparatus features a novel driven rotatable work-holding turntable or carrousel which automatically indexes the blanks to each succeeding work station, there being identical work stations located on opposite sides of said turntable to permit a particular forming operation to be performed on two workpieces simultaneously, thereby doubling the production capacity in comparison to conventional "in-line" forming and material working equipment.

A further important object of the present invention, as hereinabove mentioned, is to provide a new, improved rotary work-feeding apparatus as described wherein the blanks can be arranged and punched from the stock strip in a manner to ensure maximum utilization of the stock with a minimum of costly scrap.

A further object is to provide an apparatus as described wherein the workpieces are closely retained in specially formed cavities or nests in said turntable during the shaping or forming operations, said cavities being of the same general contour as the desired finished part. The retention of the workpieces in said cavities in the present invention functions to prevent the metal or other material from flowing or bulging laterally outwardly during the forming operations, said material actually flowing upwardly in its nest under pressure to create a workpiece of thicker cross-section, thereby permitting the use of thinner gauge stock than may be required with conventional equipment.

A further object is to provide a rotary, or carrousel-type, work-feeding unit having a number of corresponding work stations spaced about the opposite halves of its periphery, as described, wherein each finished part is automatically ejected at the final work station to clear the workpiece-retaining cavity for the reception of a new blank as the turntable completes each half revolution, thus readying the same for another operating sequence.

A further object of the present invention is to provide a material working apparatus featuring a rotatable work-feeding turntable with a hydraulic press-actuated male die unit vertically reciprocably mounted thereabove together with a coacting stationary female die unit mounted therebelow, the reciprocable motion of said press being the sole means for driving said turntable, thereby eliminating the necessity for separate electric or other power drive means, in addition to promoting the precise synchronization between said relatively movable members.

A further object of the invention is to provide an improved rotary material working apparatus as described which apparatus is provided with special means for temporarily accurately halting and locking the turntable at each work station during the forming or machining operations, together with means associated with the reciprocable press for releasing said turntable to permit the pieces to be indexed to the succeeding work stations after the performance of said operations.

A further object of the invention is to provide a new material working apparatus as described wherein electrical limit switches are provided as a safety feature to continuously monitor the operation of the unit, said switches ensuring the proper functioning of the machine by automatically halting the operation of the same in the event of a malfunction.

A further object of the invention is to provide a novel apparatus including a work-feeding turntable or carrousel which is not only designed to automatically index the workpieces to succeeding work stations during the operation of the machine, as described, but wherein means are provided for automatically raising said turntable slightly to disengage and clear the workpieces relative to the lower die members after each forming operation and prior to the indexing of the same to the next work stations.

A further object of the present invention is to provide a forming apparatus as described which apparatus is provided with adjustable lubricating means adapted to continuously automatically lubricate not only the machine but also the workpieces during the operation of said high speed apparatus.

Still further objects of the present invention are to provide a new, improved part forming apparatus which is relatively simple in design, reliable in operation, durable in construction, and which is otherwise particularly well adapted for its intended purposes.

DESCRIPTION OF THE DRAWINGS

In the accompanying drawings, wherein the same reference numerals designate the same parts in all of the views.

DETAIL DESCRIPTION

Figure 1:
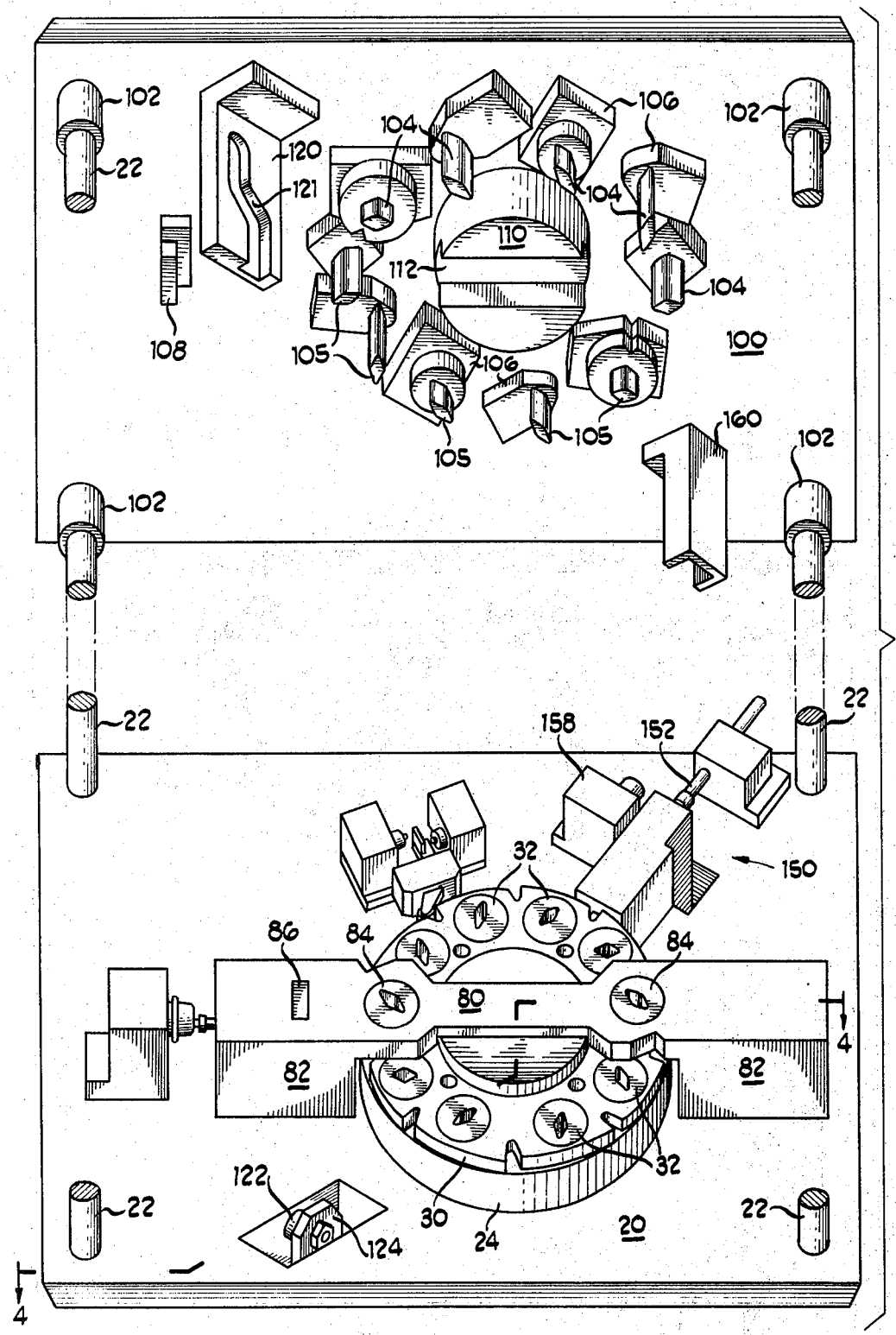
FIG. 1 is an exploded perspective view of a preferred embodiment of my invention.

In order to accomplish the above identified objects, a preferred embodiment of my invention (see FIGS. 1, 2 and 3) comprises a lower base or die shoe 20 and an upper base 100. These shoes are adapted for insertion into a press for reciprocating vertical movement with leader pins 22 of base 20 reciprocating within bushings 102 of base 100 to maintain alignment. To effect material working operations upon each stroke or reciprocation, coacting die units are mounted upon these shoes. Thus, the lower die shoe 20 carries an annular shaped female die holder 24 which mounts two sets of female die units each located about a semicircle on the holder (subsequently disclosed). In juxtaposition with these units on the upper base 100 and two sets of coacting male die units 104 and 105. As shown, each male and female die unit may comprise a work station, the work stations of each set being arranged in a semicircle and adapted to perform a different operation on a workpiece or material blank. These material blanks are received and carried between stations by a turntable or rotary indexing plate 30 having blank receiving or holding nests 32 spaced thereon and adapted to be sequentially indexed into juxtaposition with stations of one set for sequential operations. The material is fed into the unit through a stock supporting bridge 80 which is carried by posts 82 upon the lower die shoe 20, and extends across the rotary turntable 30. On this bridge and in vertical juxtaposition with the first tool member of each set 104 and 105 (which is a punch) are two female die units 84. The punches act through the female die units 84 on a downward stroke of the upper die shoe 100 to punch two workpieces or blanks into two nests or cavities 32 located 180° apart of the rotary indexing unit. Subsequently, through rotational movement of the indexing unit 30, each workpiece is carried by its associated cavity through a semicircle in a counterclockwise direction such that subsequent coacting tool members may sequentially operate on the workpiece to perform various functions. For example, as each workpiece is rotated counter-clockwise, it may be coined at the second station, pierced at different locations at the third and fourth tool stations, and then shaved by the fifth tool member as it is being ejected as a finished piece. Obviously, the specific machining steps, their number, and the direction of rotation are unimportant to my invention, and the coacting tool members may take various forms. For example, in many operations, the female die units may also perform an operation upon the lower surface of the workpiece and for this reason, the turntable or index plate 30 is vertically reciprocable for a small distance so as to raise the workpiece away from the female die units, such actuation being subsequently explained.

For this general description it should be apparent that my invention operates on at least two workpieces simultaneously to perform identical operations as the turntable 30 is rotated through each 180° on each side of bridge 80. Too, as subsequently explained, and in order to insure that the rotary turntable is balanced, it is preferable that stations which are located 180° apart to be identical.

Figure 4:
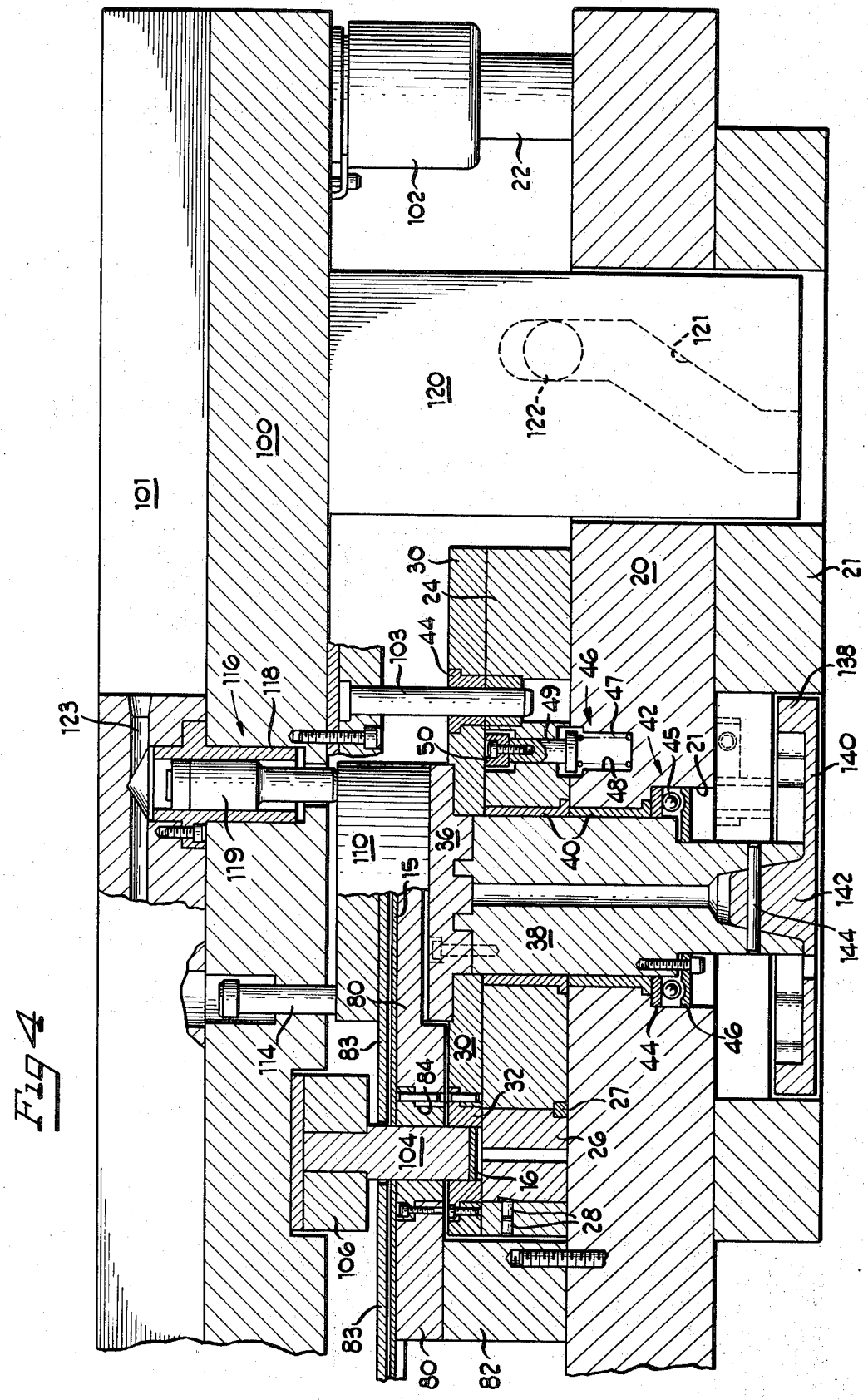
FIG. 4 is a side elevational view of the preferred embodiment taken along the lines 4—4 of FIG. 1.

Referring now to FIG. 4, the details of the preferred embodiment can be understood. Here, the upper die shoe 100 is shown in its lower position relative to die base 20, having completed its downward stroke. Considering first the details of the lower die show 20, it supports an annular female die holder 24 which may be bolted or otherwise affixed thereto. This holder 24 carries female die units 26 annularly spaced about the female die holder within apertures which are in vertical juxtaposition with the male die units 104 or 105 carried by shoe 100. Thus, these die units 26 are merely placed into an aperture within the female die holder 24, located by key 27 and held in place by double set screws 28. The members 26 may take different forms. For example, they may have apertures therein to permit piercing operations or have an upper surface which is merely hardened such that the workpiece may be properly acted upon by the upper die element 104. Specific examples are subsequently discussed with reference to FIGS. 5–7.

Above this female die holder is an indexing table 30 which is rotatably carried by a pressure pad 36 bolted (as shown) to a rotary drive shaft 38. This turntable 30 carries a plurality of cavities 32 annularly spaced adjacent its periphery. These cavities may be formed of inserts having an aperture therethrough in the shape of the piece which is to be worked, and are held in place by a dowel pin and a set screw. These cavities receive and hold workpieces 16 for material working as the turntable is indexed from station to station.

The indexing of the turntable is effected through the supporting shaft 38 which is rotatably carried in an aperture extending through the female die holder 24 and the lower die shoe 20 by bushings 40 press fitted into the aperture. Additionally, the drive shaft is rotatably journaled within the die shoe 20 by a bearing 42 which comprises an upper race 44 and a lower race 46, the latter race being bolted to a shoulder of the shaft 38 as depicted. As subsequently explained, this shaft and turntable are indexed by a cam actuated drive. As previously suggested, the indexing table 30 is capable of a small degree of vertical movement to permit the workpieces 16 to be disengaged from die members 26. Such is permitted by the bearing races in that they will separate to a small degree to permit such vertical movement. To insure proper indexing, the rotary plate and female die holder 24 also carry a plurality of inserts 44 which act as bushings to receive a leader pin 103 of the upper die unit 100. Such insures that on each downward stroke of the upper die shoe 100, the cavities 32 are properly aligned in juxtaposition with the coacting male die units 104 and 105 as well as female die units 26.

Supported above the rotary indexing plate 30 by posts 82 on each side thereof is a bridge 80 which carries a strip of stock material 15 from which the workpiece is to be formed. As viewed in FIG. 4, the stock material is fed the conventional infeed system associated with presses across the bridge 80 from right to left. Held above the bridge 80 a distance sufficient to form a channel for the stock material 15 is a cover plate 83 which aids in guiding material across the bridge 80. At opposite ends of the bridge, and in vertical alignment with the first male die of each set 104 and 105 is an aperture (unnumbered) extending through the cover plate 83 and bridge 80. Within this aperture is a blanking die 84 which is annular in shape and is provided with shoulders to abut upon shoulders of the aperture. It is held in place by dowell pin and set screw. Thus, it should be obvious that as the first male die or punch is urged downwardly by the press (acting through the upper die shoe 100) these punches will act upon the stock material 15 and punch a suitable workpiece 16 through the blanking die 84 and into the cavity 32. Further, as shown in FIG. 4, the first punch does not force the workpieces 16 completely down against the female die units 26, since at this station the punching and forming of the workpiece 16 is all that is to be accomplished. At subsequent stations, and as hereinafter explained, the male die elements 104 may extend down and force the workpiece 16 against other female die units such that a coining or piercing or desired material flow operation may be effected.

Since the workpiece 16 is forced downwardly onto the female die unit 26, in these subsequent operations, the turntable 30 should be raised before it is rotated. In order to accomplish vertical movement of the turntable 30, spring units 46 are provided. Such units may take various forms, but as depicted in FIG. 4, they include a compression spring 47 acting within a bore 48 of the lower die unit 20 against an actuator bolt 49, extending through the female die holder 24. If desired, a brass pressure plate 50 may be attached to the actuator bolt 49 as indicated so as to minimize wear and reduce friction as the indexing table 30 is rotated. Preferably, a plurality of such biasing units 47 are equally spaced about an annulus of the turntable to insure that it is balanced. Upward vertical movement of the turntable 30 is effected by the spring units 46 and permitted by the construction of the bearings 42. As observed in FIG. 4, the upper race 44 is held stationary at the upper end of a counter bore 21 within the lower die shoe 20, while the lower race 46 is bolted or otherwise affixed to the shaft 38. Thus, the indexing table 30 and shaft 38 are in a downward position and a small clearance exists between the lower race 46 and the ball bearings 45. However, as the upper die shoe 100 is raised by the press and spring units 46 urge turntable 30 upward, the lower race 46 fully seats the ball bearings 45 to provide a friction-free surface for rotary indexing of the shaft 38 and turntable 30.

Figure 2:
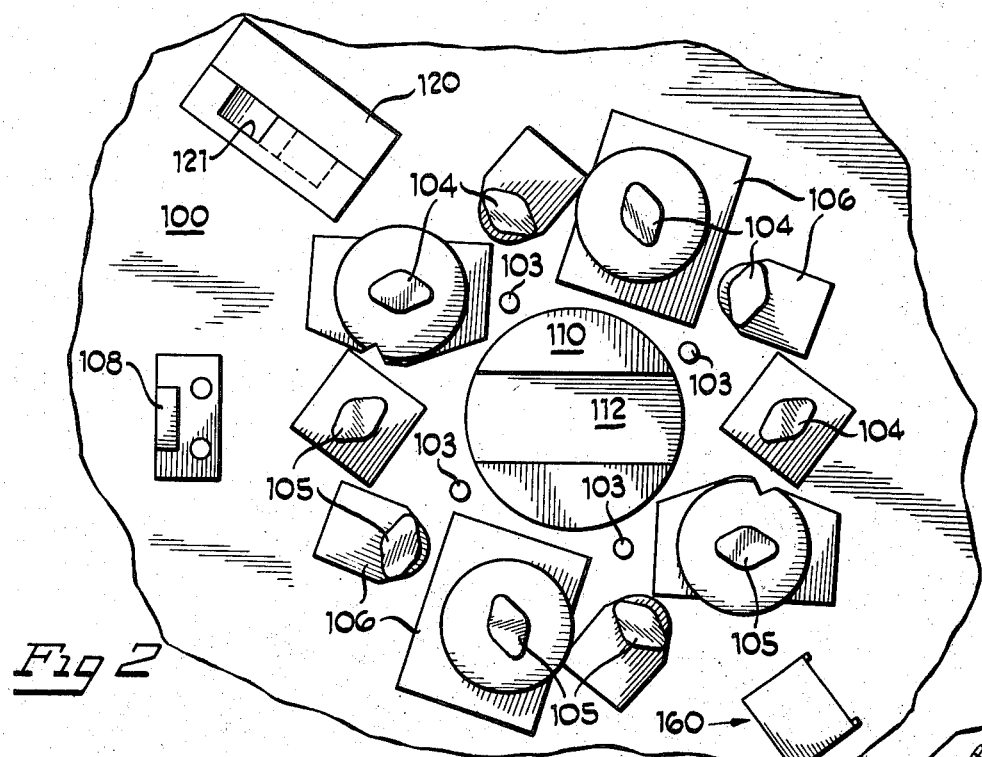
FIG. 2 is a plan view of the upper section of the preferred embodiment.

Before considering the means for effecting the rotary drive of the indexing table 30, consideration is given to the construction of the upper die shoe 100 and the details thereof. With reference to FIGS. 1, 2 and 4, it will be seen that male die elements 104 and 105 are carried by holders or inserts 106 bolted or otherwise affixed to this shoe. Obviously, the male die units may be press fitted into these inserts or held therein by appropriate set screws. Thus, a plurality of male die elements are arranged about an annulus of the upper die shoe in juxtaposition with the female die units of the lower die shoe 20. In addition to holding the male die elements, the upper die shoe 100 also carries a loading pad 110 which has an elongated slot 112 passing therethrough which receives the bridge 80 upon the downward stroke of the upper die shoe 100. The loading pad 110 is provided with relative movement with respect to the upper die shoe 100 by means of several one-way connections which include a plurality of stripper bolts 114 passing through the die unit 100 and being threadedly engaged with a loading pad 110. A larger counter bore within the upper die unit 100 as depicted in FIG. 4 permits relative movement between the loading pad and the die shoe 100. As previously indicated, the rotary indexing table 30 is vertically biased and moves upwardly upon each stroke prior to indexing of the turntable 30. Accordingly, means must be provided for repositioning the turntable 30 in abutting relationship with the female die holders 24 and the female dies 26. Such is accomplished by a plurality of diedraulic units 116 carried in spaced annular relation to the loading pad 110, one of the units being depicted in FIG. 4. Thus, the diedraulic unit comprises a housing 118 appropriately sealed within the upper die shoe 100 which extends into the subplate 101 of the upper die shoe and is bolted or held in place as indicated. Within the housing 118 is a piston unit 119 whose lower end acts downwardly upon the loading plate 110. Accordingly, fluid pressure is exerted through an aperture 123 of the subplate 101 to act against the upper surface of a plurality of annular pistons 119 to apply force against the upper surface of a loading plate 110. Consequently, as the die shoe 100 is vertically raised on leader pins 22, the pistons hold the loading pad 110 against the pressure pad 36 until the stripper bolt 114 reaches the end of the counter bore within the upper die unit 100, at which time the loading pad 110 is raised. Thus, the loading pad 110 lags the die unit 100 in its upward movement. Too, the use of the diedraulic unit also causes the loading pad 110 to lead the die shoe 100 down, and it engages the pressure pad 36 to seat the rotary turntable 30 prior to the time that the male die elements pass through the nests 32 of the turntable to act against the female die units 26. These diedraulic units are conventional and well known in the art and further explanation of their details including pressures and valving operations are believed to be unnecessary. Thus, as the upper die shoe 100 is moved upwardly, the pressure is relieved from the rotary turntable 30, and the spring units 46 will effect vertical movement of the turntable upwardly for a short distance until the bearings 45 seat against the lower races 46. At this time, indexing of the turntable 30 to the next station can be effected.

Figure 8:
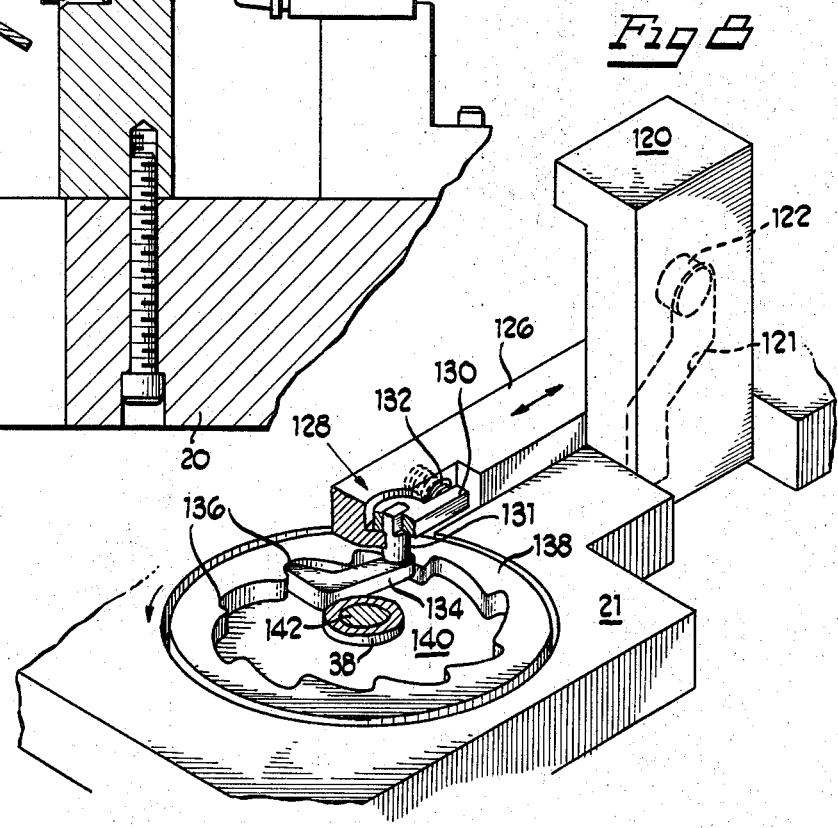
FIG. 8 is a perspective view of a rotary drive mechanism used with the preferred embodiment of my invention.

This indexing movement is effected solely by vertical movement of the upper die shoe 100 which carries an operating cam 120 having a camming slot 121 therein. This camming slot is engaged by a roller 122 rotatably journaled on an upstanding linkage 124. (See FIG. 1). The latter element extends downwardly and is attached to an operating or actuating arm 126 (See FIG. 8) which is caused to reciprocate in the direction of the arrows indicated in FIG. 8, the actuating arm being guided within a slot of the lower sub-plate 21, and carries a biased cam linkage 128. This linkage 128 comprises a first lever 130 which is keyed to vertical shaft 131 journaled in the lower portion of the actuator arm 126 for rotational movement. A spring 132 biases the lever 130 outwardly as viewed in FIG. 8, and such in turn causes a cam 134 to be rotated into engagement with notches 136 formed in an upstanding flange 138 of cam plate 140. Thus, it will be observed that vertical movement of the upper die shoe 100 causes reciprocable action of actuator arm 126 through cam 120 and its follower 122, such being translated into rotational motion of the cam plate 140. This rotational motion is transmitted to the rotary shaft 38 by an upstanding hub 142 connected to the shaft 38 by a dowel pin 144 as indicated in FIG. 4.

In view of this discussion, the basic operation of the unit can be understood. The apparatus is first mounted in a vertical press which is capable of reciprocating the upper die unit preferably at speeds of 80 strokes per minute. Too, the press may also be provided with a feed mechanism which feeds stock material 15 into the supporting bridge 80, the infeed stroke being sufficient to insert a length of stock material at least twice the width of one workpiece 16. Thus, FIG. 3 discloses the stock material advancing from right to left with the infeed stroke providing sufficient material for a second workpiece to be formed by the first tool or punch of set 105 between the blanks formed by the first tool of set 104. As the upper base is moved downwardly, the loading pad 110 under pressure of the diedraulic unit 116 causes the pressure pad 36 and turntable 30 to seat against the female dies and the first male die or punch of each set 104 and 105 extends through the two associated dies 84 of bridge 80 to punch a workpiece 16 into diametrically opposed cavities 32 underneath the bridge. On the upward stroke of the base 100, the stripper bolts 114 raise the loading pad 110 to permit spring units 47 to raise the turntable 30. As soon as the carrousel 30 is raised, the roller 122 within the cam slot 121 will have moved to the angular section which is at an angle to the vertical to commence reciprocation of the actuator arm 126. This inward reciprocation of roller 122 urges arm 126 and cam 134 (biased into engagement with the notches 136 on the plate 140) to the left (see FIG. 8) to rotate the turnplate in the direction of the arrow. Such rotation then indexes the two previously stamped workpieces 16 into juxtaposition with the next pair of coacting dies for a second operation. Thus, each subsequent stroke of the die unit 100 will form workpieces in two cavities 32 at each end of the bridge 80 and simultaneously perform operations at the subsequent stations.

Figure 5:
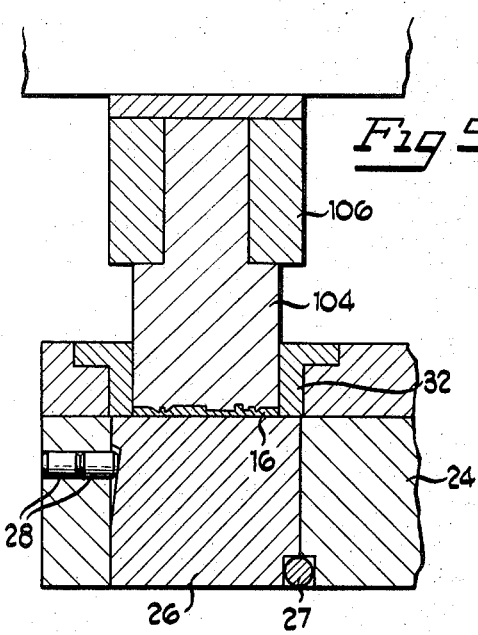
FIG. 5 is a side elevational view in section of a machining station of my invention.
Figure 6:
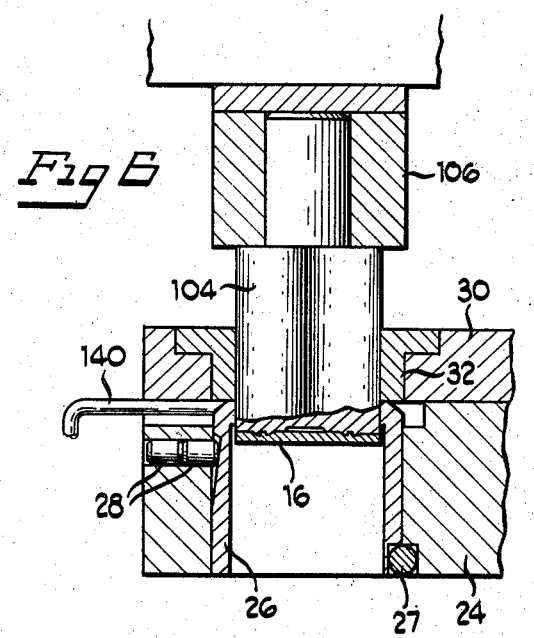
FIG. 6 is a side elevational view of a section of another machining station of my invention.
Figure 7:
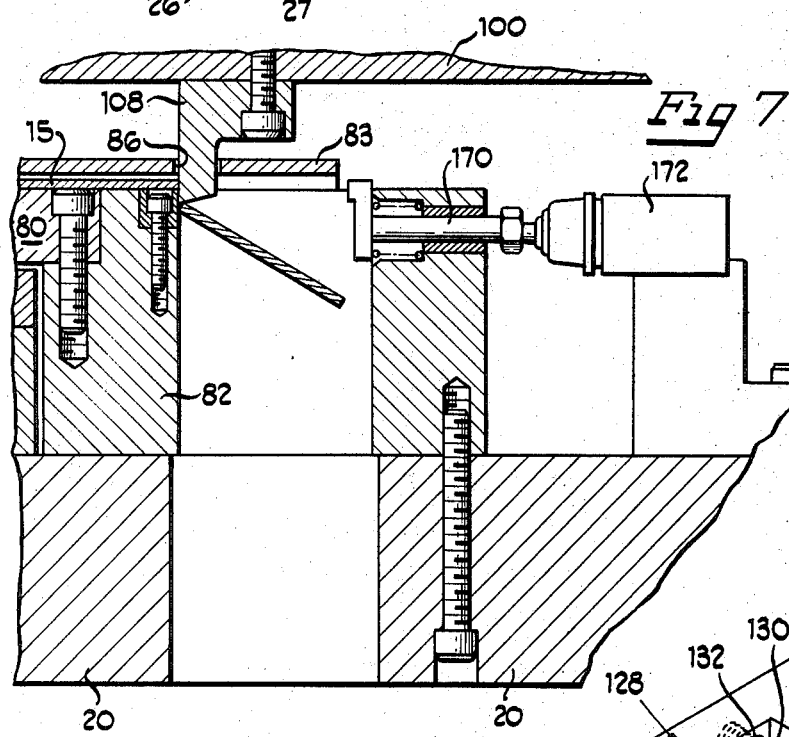
FIG. 7 is a side elevational view taken along the lines 7—7 of FIG. 3.

Such subsequent stations may perform a coining function as depicted in FIG. 5. Here the male die 104 has a coining surface and urges the workpiece 16 against the female die 26 to perform this machining operation. Obviously, the workpiece, being constrained by the cavity 32 does not permit the workpiece to flow laterally during this operation, thus permitting the use of a thinner gage stock to achieve the same cross-sectional thickness. At subsequent stations about each set of tools on opposite sides of bridge 80, additional operations such as piercing may be performed. However, at the last station of each set, the workpiece must be discharged from the cavity 32 and such may be accomplished as illustrated in FIG. 6. Here, the female die 26 is a shearing insert which permits the last element of set 104 or 105 to force the workpiece out of cavity 32, simultaneously shearing and dimensioning the sides of the workpiece 16. After being forced through the female die, it drops into a collection area (not shown), while a conduit 140 directs a cleaning fluid such as air or oil against the female die 26 to dispose of scrap material resulting from the shearing action.

Referring again to FIGS. 1 – 3, the remainder of the unit can be understood. Mounted on the lower die base 100 is a cam actuated lock member 150. As depicted, it includes a plunger 152 forwardly biased by a spring (not shown) within housing 154 into notches 33 intermediate each station of the turntable 30. Thus, when the carrousel 30 has been indexed, the forward end of the plunger 152 engages the notches 33, and upon such inward movement, an arm 156, attached to the plunger, engages a safety switch 158 which permits the press to commence its downward stroke. In the absence of such engagement, the press is stopped. A cam follower 159 riding in a cam slot (not shown) of cam 160 causes retraction of the plunger during the upward stroke of the plunger.

The numeral 166 designates another member which is removably insertable in the aforementioned turntable notches 33, said member 166 being operatively associated with an electronic timer-switch unit 168 as a safety precaution. Once the time interval required for the turntable to index to each succeeding station has been determined, said electronic timer-switch device is set so that in the event the turntable does not index at precisely the predetermined speed a spring-loaded brake is actuated which functions to instantaneously halt the operation of the press. Actually, in the preferred embodiment of the invention the advancement of the stock strip, the indexing of the turntable, the action of the rotatable motion-imparting mechanism, as well as the operation of the retractable locking means, are all electronically monitored with limit switches that fit into a compact housing conveniently located adjacent the machine, thus permitting the entire operational sequence to be carefully monitored by the operator at all times to ensure proper operation.

Figure 3:
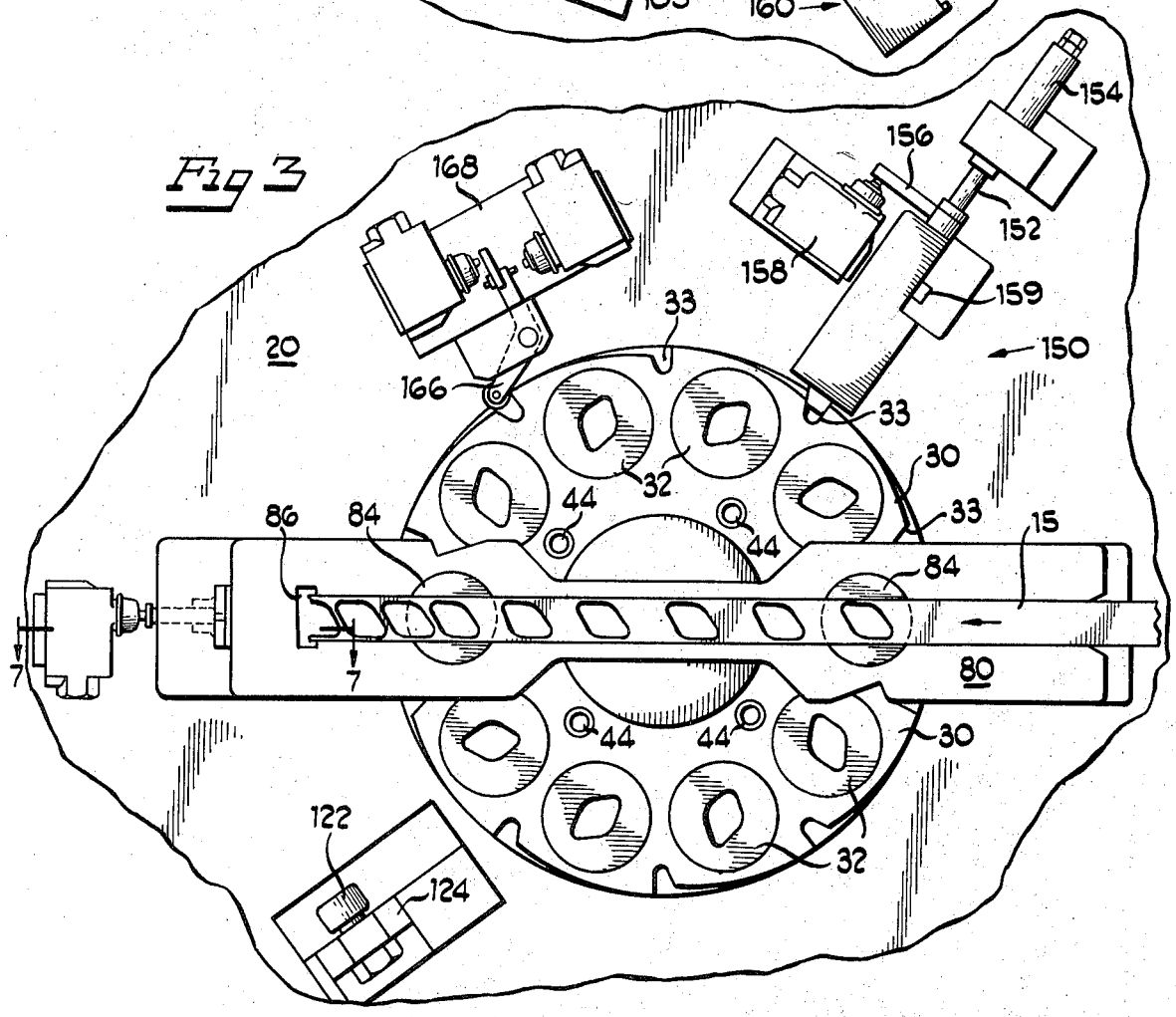
FIG. 3 is a plan view of the lower section of the preferred embodiment.

Finally, with reference to FIGS. 1 and 3, the supporting bridge is also provided with an aperture 86 into which a shearing punch 108 extends on each stroke of upper base 100. As more specifically shown in FIG. 7, this punch shears the excess material of the feed stock upon each infeed stroke, thus permitting scrap to be easily collected. Finally, a plunger 170 biased (as shown) towards the slot will be engaged and reciprocated upon a failure of the punch 108 to shear the excess material. In such event, the plunger will actuate a limit switch within a housing 172 to stop the press.

From the foregoing detailed description it will be seen that the present invention provides a new, improved apparatus for forming and/or working parts which apparatus has a number of advantages over conventional machining equipment intended for the same general purposes. With said improved apparatus a rotatable, carrousel-type work-holding table is provided which automatically indexes the blanks or workpieces to succeeding work stations positioned around one-half of the turntable, there being identical work stations located on the opposite side of said turntable to permit a particular forming operation to be performed on two workpieces simultaneously, thereby doubling the production capacity in comparison to conventional "in line" machining arrangements. In addition, with the present invention, the blanks can be arranged for punching from the stock strip in a manner ensuring maximum utilization of the stock with a minimum of costly scrap.

A further advantage of the present apparatus is that the blanks are confined in a cavity or nest during the forming operations, thereby preventing the material from spreading or flowing laterally outwardly under pressure. The result is that thinner gauge, less costly stock material may be used than is required with conventional machining equipment.

Obviously, lubricating lines may be used to deliver fluid to the workpieces for cooling same, and lubricate the apparatus while abutments may be used to limit the downward stroke of the upper die shoe 100. Too, numerous variations or modifications of the preferred embodiment will undoubtedly occur to those having skill in this art. Moreover, although the illustrated apparatus is set up for the manufacture of small metal parts, such as aluminum transistor bases, it is to be clearly understood that the design of the present machine can be modified to produce any part or article requiring multiple forming or machining operations, without departing from the spirit of the invention. In other words, the present apparatus is not to be limited to the production of any particular article of manufacture, or to parts formed of any particular metal or other material. Rather, what is intended to be covered herein is not only the illustrated form of the present invention but also any and all variations or modifications thereof as may come within the spirit of said invention. Obviously, the direction of rotation of the turntable, the number of stations, and the direction of feeding the raw stock include some of these modifications.

I claim:

1. An apparatus for forming and machining workpieces comprising:
   a. upper and lower die bases having interconnecting means for permitting relative vertical movement therebetween;
   b. two sets of coacting pairs of tools arranged in a circle on said die bases; each set having means to sequentially perform a series of operations upon stock material;
   c. an indexible turntable carried by one of said bases having cavities therein for receiving workpieces;
   d. stock supporting means carried by one of said bases and having dies in juxtaposition with the first coacting pair of each set of tools for permitting workpieces to be punched into said cavities for subsequently indexing same, and said turntable sequentially indexing the workpieces punched from each of said dies into juxtaposition with one set of said coacting pairs of tools.

2. An apparatus as recited in claim 1 in which:
   a. the stock supporting means and the first pair of each set of tools are positioned approximately 180° apart; and
   b. each pair of each set of tools are identical to a pair of the other set; said identical pairs being located 180° apart on said circle.

3. An apparatus as recited in claim 1 in which:
   a. the last pair of tools of each set performs a shearing function and ejects the workpiece from the cavity.

4. An apparatus as recited in claim 1 in which:
   a. said turntable is vertically reciprocable mounted for moving the workpieces of each cavity off of the tools of the lower base; and
   b. the upper die base includes pressure means for returning the workpieces against said tools.

5. An apparatus as recited in claim 1 in which:
   a. cam means are interposed between said turntable and one of said die bases for rotating said turntable upon vertical movement of said die bases.

6. An apparatus for machining workpieces comprising:
   a. die bases having connecting means therebetween to allow said die bases to be vertically reciprocated by a press and carrying two sets of coacting pairs of machining tools, each set having means to perform sequential operations on a workpiece;
   b. indexible carrousel means carried by one base having cavities circularly arranged for holding workpieces;
   c. material support means carried by one of said bases and coacting with the first pair of tools of each set for delivering workpieces to said cavities; and said carrousel sequentially indexing the workpieces delivered from each first pair of tools into juxtaposition with one set of said coacting pairs of tools.

7. An apparatus as recited in claim 6 in which:
   a. cam means are interposed between said die bases and said carrousel for indexing said turntable through each set of tools.

8. An apparatus as recited in claim 6 in which:
   a. each set of tools includes means for punching, coining and shearing workpieces from stock material.

9. An apparatus as recited in claim 8 in which:
   a. the tools of each set performing the same function are positioned approximately 180° apart.

10. An apparatus as recited in claim 7 in which:
    a. the carrousel means and its base carry biasing means for raising said carrousel prior to indexing; and
    b. the other base carries diedraulic means for lowering said carrousel.

11. An apparatus for machining workpieces comprising:
    a. base support means carrying a carrousel having cavities arranged in a circle for receiving and holding workpieces;
    b. support means vertically reciprocable relative to said base support means and carrying two sets of material working tools, each set arranged in a semicircle to correspond with said cavities to perform working operations on said workpieces;

c. stock support means in juxtaposition with the first tool of each set to coact therewith in supplying workpieces to said cavities; and d. indexing means for sequentially moving said carrousel and its cavities and workpieces therein into juxtaposition with each tool of one set for performing machining operations on said workpieces.

12. An apparatus as recited in claim 11 in which:

a. the last tool of each set performs a shearing operation and ejects the finished workpiece from said cavity.

13. An apparatus as recited in claim 11 in which:

a. the stock support means extends across said carrousel and each set of tools extends from said supplying means about an arc of said circle less than 180°.

14. An apparatus for performing multiple forming operations on a plurality of identical workpieces, comprising: a power-actuated, vertically reciprocable upper die unit; a plurality of die elements arranged in spaced, circular relationship on the underside of said unit, each of the dies arranged around one-half of said circle having an identical die element diametrically opposite thereto; a lower die unit mounted below said upper die unit; a plurality of die elements arranged in spaced, circular relationship on said lower die unit, the latter die elements being aligned beneath and designed to coact with said upper die elements; a rotatable work-holding turntable interposed between said upper and lower die units, said turntable having means for retaining workpieces therein; means adapted to automatically index said turntable to position said workpieces in alignment with said die elements for the performance of forming operations thereon upon the downward stroke of said upper die unit, thus performing identical operations on two workpieces simultaneously on opposite halves of said turntable, and said indexing means being adapted to continue indexing said turntable, after each machining operation, to position said workpieces in alignment with successive die sets until said workpieces have been acted upon by all of said coacting die elements.

15. The apparatus recited in claim 14 wherein the work-holding means on said turntable comprises a plurality of spaced cavities in and extending through said turntable.

16. The apparatus recited in claim 15 wherein said cavities are of a size and shape closely conforming to the size and shape of the intended finished part.

17. The apparatus recited in claim 16 and including: means for supporting a strip of stock material immediately above said turntable, said stock strip being only slightly wider than the width of the workpiece to be punched therefrom; first punch means depending from said upper die unit adapted to punch blanks out of said stock strip and insert the same in a turntable cavity aligned therebelow; and second punch means depending from said upper die unit adapted to punch blanks out of said stock strip and insert the same in the diametrically opposite cavity in said turntable.

18. The apparatus recited in claim 17 wherein said punch means are adapted to punch said blanks out at an angle to the longitudinal axis of said stock strip, in closely adjacent relationship, to conserve material and minimize scrap.

19. The apparatus recited in claim 14 and including electronic timer and switch means operatively associated with said apparatus adapted to automatically halt the operation thereof in the event of a malfunction.

* * * * *